United States Patent
Wada et al.

(10) Patent No.: US 11,821,101 B2
(45) Date of Patent: Nov. 21, 2023

(54) FILM, FILM FORMING METHOD, AND SURFACE-COATED MATERIAL

(71) Applicant: Toyota Jidosha Kabushiki Kaisha, Toyota (JP)

(72) Inventors: Koji Wada, Kobe (JP); Haruyuki Nakanishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/467,681

(22) Filed: Sep. 7, 2021

(65) Prior Publication Data

US 2022/0074068 A1    Mar. 10, 2022

(30) Foreign Application Priority Data

Sep. 9, 2020    (JP) .................................. 2020-151421

(51) Int. Cl.
| | |
|---|---|
| C25D 9/04 | (2006.01) |
| C25D 17/00 | (2006.01) |
| C25D 17/10 | (2006.01) |
| C25D 5/00 | (2006.01) |
| C25D 7/12 | (2006.01) |
| C25D 11/00 | (2006.01) |
| C25D 11/34 | (2006.01) |
| H01M 4/48 | (2010.01) |
| H01M 4/66 | (2006.01) |

(52) U.S. Cl.
CPC ............... *C25D 9/04* (2013.01); *C25D 5/003* (2013.01); *C25D 7/12* (2013.01); *C25D 11/00* (2013.01); *C25D 11/34* (2013.01); *C25D 17/002* (2013.01); *C25D 17/10* (2013.01); *H01M 4/48* (2013.01); *H01M 4/662* (2013.01)

(58) Field of Classification Search
None
See application file for complete search history.

(56) References Cited

U.S. PATENT DOCUMENTS

2019/0074553 A1    3/2019    Takahashi et al.

FOREIGN PATENT DOCUMENTS

| JP | 2000-323139 A | 11/2000 |
| JP | 2011-233423 A | 11/2011 |
| JP | 2019-046644 A | 3/2019 |

OTHER PUBLICATIONS

Meier et al., Journal of Applied Electrochemistry 10 (1980) pp. 611-621) (Year: 1980).*
Chu et al., A.H. Chu et al 2020 IOP Conf. Ser.: Earth Environ. Sci. 508 012192 (Year: 2020).*
Olivier Guiader and Patrick Bernard 2018 J. Electrochem. Soc. 165 A396 (Year: 2018).*

* cited by examiner

*Primary Examiner* — Louis J Rufo
(74) *Attorney, Agent, or Firm* — Dinsmore & Shohl LLP

(57) ABSTRACT

A film that contains $Ni_2O_3H$ as a main component.

2 Claims, 4 Drawing Sheets

FILM, FILM FORMING METHOD, AND SURFACE-COATED MATERIAL

CROSS-REFERENCE TO RELATED APPLICATION

This application claims priority to Japanese Patent Application No. 2020-151421 filed on Sep. 9, 2020, incorporated herein by reference in its entirety.

BACKGROUND

1. Technical Field

The present disclosure relates to a film, a film forming method, and a surface-coated material.

2. Description of Related Art

As a surface modification treatment for a Ni (nickel) material, a method of forming a nickel fluoride passivation film that has anticorrosion properties on a surface of the Ni material by using fluorine gas is known.

Japanese Unexamined Patent Application Publication No. 2011-233423 (JP 2011-233423 A) discloses a method of suppressing an increase in amounts of $Ni_2O_3H$ generated in a positive electrode of an alkaline storage battery, such as a nickel-hydrogen battery. However, a film that contains $Ni_2O_3H$ as a main component is not known.

SUMMARY

Nickel fluoride has anticorrosion properties but is an electrical insulator. Therefore, this material is inapplicable to Ni materials in need of a conductive surface. Furthermore, owing to its toxicity, fluorine gas needs expensive facilities, such as a detoxification device.

The present disclosure provides a technique of forming an anticorrosive and conductive film on a surface of a Ni material.

Hereinafter, technical configurations and effects of the present disclosure will be described. However, some parts of the mechanism of action of the present disclosure are based on assumption. Whether the mechanism of action is right or wrong does not limit claims.

A first aspect of the present disclosure relates to a film that contains $Ni_2O_3H$ as a main component.

The film that contains $Ni_2O_3H$ as a main component has anticorrosion properties and conductivity.

A second aspect of the present disclosure relates to a film forming method. In the second aspect, by repeatedly alternately applying a first potential and a second potential to a Ni material on which a film is to be formed in a state where the Ni material is immersed in an alkaline solution, a film that contains $Ni_2O_3H$ as a main component is formed on a surface of the Ni material. The first potential is within a potential range in which Ni turns tetravalent in a Ni—$H_2O$ system. The second potential is within a potential range in which Ni turns divalent in the Ni—$H_2O$ system.

According to the second aspect, by the application of the first potential and the second potential in the above range to the Ni material in an alkaline solution, a film that contains $Ni_2O_3H$ as a main component can be formed on the surface of the Ni material.

In the second aspect, the alkaline solution may have, for example, a temperature of 40° C. to 90° C. and a pH of 10 or higher.

In the second aspect, the alkaline solution may be one of a KOH solution, a NaOH solution, and a LiOH solution.

A third aspect of the present disclosure relates to a surface-coated material. The third aspect includes the film of the first aspect and a Ni material in which at least a part of a surface is coated with the film.

The surface-coated material in the present disclosure is expected to have improved anticorrosion properties due to the film.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure (hereinbelow, also described as "the present embodiment") will be described. However, claims are not limited to the following description.

In the present embodiment, unless otherwise specified, for example, a description, such as "1 to 10 μm", represents a range including limits. That is, for example, a description of "1 to 10 μm" represents a range of "1 μm or more and 10 μm or less".

Film

The film contains $Ni_2O_3H$ as a main component. The main component is a component that accounts for the highest mass percentage. The ratio of the main component to all the components of the film is 70% by mass or more, 80% by mass or more, or 90% by mass or more. The film may be a film that is only composed of $Ni_2O_3H$, or a film that is substantially composed of $Ni_2O_3H$ and contains traces of unavoidable impurities. The film can contain, for example, $Ni(OH)_2$.

The thickness of the film is not particularly limited, but is, for example, 100 to 200 nm.

Film Forming Method

In the film forming method of the present disclosure, by repeatedly alternately applying a first potential (upper potential) and a second potential (lower potential) to a Ni material in a state where the Ni material is immersed in an alkaline solution, a film that contains $Ni_2O_3H$ as a main component (hereinafter, simply described as "$Ni_2O_3H$ film") is formed on the surface of the Ni material. The first potential is within a potential range in which Ni turns tetravalent in a Ni—$H_2O$ system. The second potential is within a potential range in which Ni turns divalent in the Ni—$H_2O$ system.

According to the present disclosure, by keeping the first potential and the second potential within the above range, it is possible to form a film that contains $Ni_2O_3H$ as a main component ($Ni_2O_3H$ film) on the surface of the Ni material.

Figure 2:
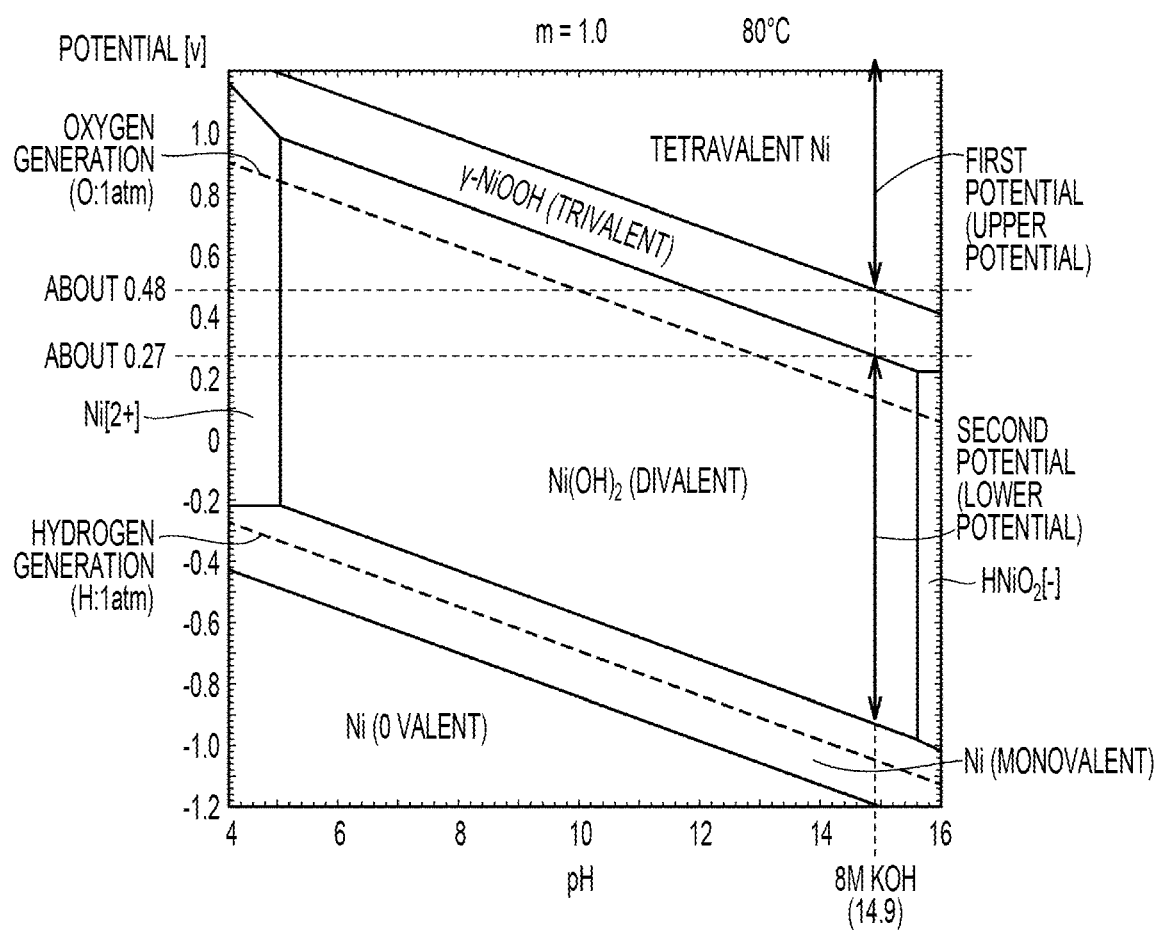
FIG. 2 is a potential-pH diagram of Ni at 80° C.

FIG. 2 is a potential-pH diagram of Ni (Ni—$H_2O$ system) at 80° C. (a diagram in which the regions where various chemical species of Ni in water exist are plotted as two-dimensional coordinates of electrode potential and pH). As shown in FIG. 2, for example, in a case where an 8M KOH aqueous solution (pH 14.9) at 80° C. is used as an alkaline solution, the first potential (potential at which Ni turns tetravalent) is a potential higher than about 0.48 V. The second potential (potential at which Ni turns divalent) is a potential within a range of about 0.27 V or less.

In the film forming method of the present embodiment, the first potential is about 0.48 V or higher. In a case where the first potential is too low in this range, the film forming rate is lowered. In a case where the first potential is far higher than the second potential combined, the film forming efficiency deteriorates. Therefore, the first potential is appropriately set.

In the film forming method of the present embodiment, the second potential is about 0.27 V or less. In a case where the second potential is too high in this range, the film forming rate is lowered. In a case where the second potential is too low, the ratio of $Ni_2O_3H$ to $Ni(OH)_2$ is lowered. Therefore, the second potential is appropriately set.

Figure 3:
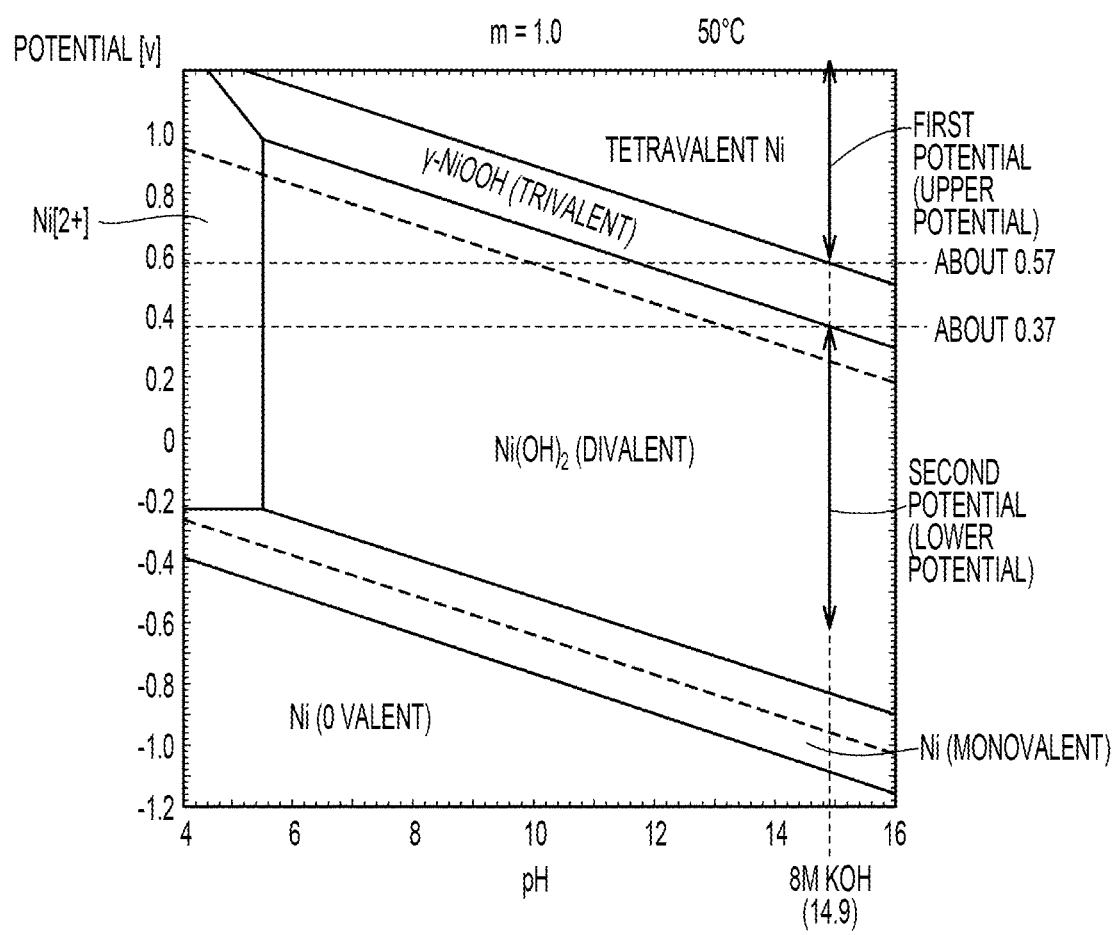
FIG. 3 is a potential-pH diagram of Ni at 50° C.

FIG. 3 is a potential-pH diagram of Ni at 50° C. As shown in FIG. 3, for example, in a case where an 8M KOH aqueous solution at 50° C. is used, the first potential is a potential higher than about 0.57 V. The second potential is a potential of about 0.37 V or less.

As shown in FIGS. 2 and 3, the range of the first potential and the second potential used in the film forming method of the present embodiment varies with the pH, temperature, and the like of the alkaline solution. Therefore, it is desirable to apply potentials in an appropriate range of the first potential and the second potential that satisfies the above conditions, depending on the pH, temperature, and the like of the alkaline solution.

In the film forming method of the present embodiment, the temperature of the alkaline solution is 40° C. to 90° C., or 45° C. to 85° C.

The pH of the alkaline solution is 10 or higher, 12 or higher, or 14 or higher.

Specific examples of the alkaline solution include a KOH solution, a NaOH solution, and a LiOH solution. In some embodiments, the KOH solution and the NaOH solution may be selected. In some embodiments, alkaline solution has a concentration at which the pH described above is obtained.

The first potential is applied, for example, for 5 seconds each time. The second potential is applied, for example, for 10 seconds each time. The potential application time is appropriately set depending on the solution conditions (type, pH, and temperature of the alkaline solution). The total application time of the first potential and the second potential is appropriately set such that a $Ni_2O_3H$ film with a desired thickness is obtained.

$Ni_2O_3H$ can be obtained as powder by a hydrothermal treatment or the like. Therefore, it is also possible to conceive of a method of applying a slurry that contains the powder to the surface of a Ni material and drying the slurry. However, in this case, the film forming process that includes the preparation of $Ni_2O_3H$ powder is intricate, and it is difficult to treat the Ni material that has a complicated shape.

In contrast, compared to the method of using $Ni_2O_3H$ powder, the film forming method of the present embodiment further simplifies the film forming process and makes it possible to more easily form a $Ni_2O_3H$ film on the surface of a Ni material that has a complicated shape. Furthermore, the film forming method of the present embodiment makes it possible to form a thin film and to efficiently impart anticorrosion properties (alkali resistance) to the surface of a material.

The Ni material is a material (part) in which at least a part of a surface contains Ni. That is, the Ni material may be a Ni bulk material or a non-Ni material in which a surface is coated with Ni plating or the like.

The aforementioned $Ni_2O_3H$ film is formed as an alkaline material and has anticorrosion properties (particularly, anticorrosion properties in an alkaline environment). Therefore, the $Ni_2O_3H$ film can be suitably used for coating the surface of a Ni material (a material in which at least a surface thereof contains Ni) used in a highly alkaline environment, for example. Forming an anticorrosive and conductive $Ni_2O_3H$ film on the surface of a Ni material makes it possible to suppress the corrosion of the Ni material without impairing the conductivity of the Ni material, and such a Ni material is expected to be used for a long period of time.

Examples of Ni materials used in a highly alkaline environment include parts of Ni-based secondary batteries, Ni Celmet (registered trademark) substrates for positive electrodes, reference electrodes used for electrochemical measurement or electrochemical control in a highly alkaline environment, Ni materials for alkaline fuel cells, Ni materials for plants, and Ni plating for electronic circuit parts.

In addition, the aforementioned Ni material is expected to be applied to products that need the electrical characteristics (such as ionic conductivity and semiconductor properties), thermal characteristics, optical characteristics (metallic luster of Ni and black of $Ni_2O_3H$), and catalytic action of $Ni_2O_3H$. Examples of such products include a Ni-containing electrode of a water splitting device and the like. Coating the surface of a Ni-containing electrode of a water splitting device and the like with the aforementioned $Ni_2O_3H$ film will lead to long-term use of the electrode, efficient splitting by suppression of hydrogen overvoltage or oxygen overvoltage, and the like.

Surface-Coated Material

The surface-coated material of the present embodiment includes the aforementioned film that contains $Ni_2O_3H$ as a main component, and a Ni material in which at least a part of a surface is coated with the film. That is, the film and the film forming method described above can be used for manufacturing the surface-coated material.

Examples of the surface-coated material of the present embodiment include a Ni current collector foil for a positive electrode of a Ni-based battery. Examples of the Ni-based battery include a nickel-hydrogen battery (nickel-metal hydride battery: Ni-MH), a nickel-cadmium battery, and a nickel-zinc battery. The Ni-based battery may be a primary battery or a secondary battery.

Battery

Figure 4:
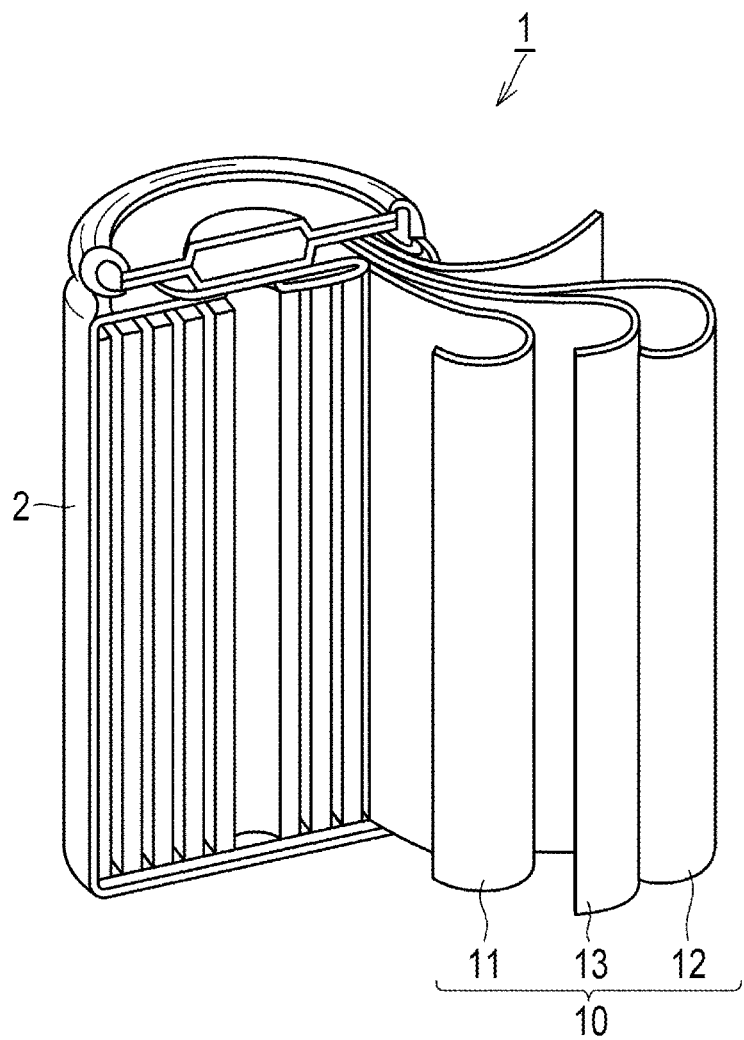
FIG. 4 is a schematic view showing an example of a battery to which a film and a film forming method of an embodiment are applied.

An example of the nickel-hydrogen battery (Ni-MH) will be described below. FIG. 4 is a schematic view showing an example of the nickel-hydrogen battery. A battery 1 is a nickel-hydrogen battery. The battery 1 may be, for example, Ni-MH. The battery 1 includes a housing 2. The housing 2 is a cylindrical case. The housing 2 is made of a metal. Note that the housing 2 may have any form. The housing 2 may be, for example, a square case. The housing 2 may be, for example, a pouch made of an aluminum laminated film. The housing 2 may be made of a resin, for example.

The housing 2 may be, for example, a pressure-resistant container. For example, the housing 2 may be filled with hydrogen gas such that the internal pressure of the housing 2 is equal to or higher than the dissociation pressure of a hydrogen storage alloy. For example, the housing 2 may be filled with hydrogen gas such that the internal pressure of the housing 2 is 0.2 MPa to 10 MPa.

The housing 2 houses a storage element 10 and an electrolytic solution. The storage element 10 includes a positive electrode 11, a negative electrode 12, and a separator 13. The storage element 10 is in the form of a roll. The storage element 10 is formed by winding a beltlike electrode in the form of a roll. The storage element 10 may be, for example, a laminated type. The storage element 10 may be formed, for example, by laminating sheet-like electrodes.

Negative Electrode

The negative electrode 12 is in the form of a sheet. The negative electrode 12 may have a thickness of 10 μm to 1 mm, for example. The negative electrode 12 has a lower potential than the positive electrode 11. The negative electrode 12 contains a negative electrode active material. The negative electrode active material includes a hydrogen storage alloy. The negative electrode 12 may be substantially composed only of the negative electrode active material.

A hydrogen storage alloy reversibly stores and releases hydrogen. The hydrogen storage alloy is not particularly limited. The hydrogen storage alloy may be, for example, an AB type alloy (such as TiFe), an $AB_2$ type alloy (such as $ZrMn_2$, $ZrV_2$, or $ZrNi_2$), an $A_2B$ type alloy (such as $Mg_2Ni$ or $Mg_2Cu$), an $AB_5$ type alloy (such as $CaNi_5$, $LaNi_5$, or $MmNi_5$), an $A_2B_7$ type alloy (such as $La_2Ni_7$), or an $A_5B_{19}$ type alloy (such as $Pr_4MgNi_{19}$). The negative electrode 12 may contain only one hydrogen storage alloy. The negative electrode 12 may contain two or more hydrogen storage alloys. For example, the negative electrode 12 may contain at least one alloy selected from the group consisting of an $AB_5$ type alloy, an $A_2B_7$ type alloy, and an $A_5B_{19}$ type alloy.

For example, "Mm" in "$MmNi_5$" represents mischmetal. "Mischmetal" refers to a mixture of rare earth elements that contain Ce and La as a main component. "Ce and La as a main component" means that the total content of Ce and La accounts for 50% by mass or more of the total amount of the mixture. Mm may contain Nd, Pr, Sm, Mg, Al, Fe, and the like in addition to Ce and La. Mm may contain, for example, Ce at 40% by mass or more and 60% by mass or less, La at 10% by mass or more and 35% by mass or less, and Nd, Pr, Sm, and the like that make up the balance. Mm may contain, for example, 53.7% by mass of Ce, 24.1% by mass of La, 16.5% by mass of Nd, and 5.8% by mass of Pr.

The negative electrode 12 may further include a current collector, a binder, and the like in addition to the negative electrode active material. The current collector may include, for example, a punching metal, a metal foil, and a porous metal sheet. The current collector may be made of, for example, Ni.

For example, the negative electrode 12 can be formed by coating the current collector with the negative electrode active material and the binder. The binder binds the current collector and the negative electrode active material. The binder may contain any component. The binder may contain, for example, at least one component selected from the group consisting of styrene butadiene rubber (SBR), carboxymethyl cellulose (CMC), polytetrafluoroethylene (PTFE), and an acrylic resin. The mixing amount of the binder may be, for example, 0.1 parts by mass to 10 parts by mass with respect to 100 parts by mass of the negative electrode active material.

Positive Electrode

The positive electrode 11 is in the form of a sheet. The positive electrode 11 may have a thickness of 10 μm to 1 mm, for example. The positive electrode 11 has a higher potential than the negative electrode 12. The positive electrode 11 contains a positive electrode active material. The positive electrode active material may contain any component. The positive electrode active material may contain, for example, at least one component selected from the group consisting of nickel hydroxide, manganese dioxide, and silver oxide.

The positive electrode 11 may be substantially composed of only the positive electrode active material. The positive electrode 11 may further contain a current collector, a conductive material, a binder, and the like in addition to the positive electrode active material. The current collector may include a porous metal sheet, for example. The current collector is made of Ni.

For example, at least a part of a surface of the current collector made of Ni is coated with the aforementioned $Ni_2O_3H$ film. The current collector (positive electrode) coated with the $Ni_2O_3H$ film is expected to be used for a long period of time.

For example, the positive electrode 11 can be formed by coating the current collector with a positive electrode active material, a conductive material, and a binder. The conductive material has electron conductivity. The conductive material may contain any component. The conductive material may contain, for example, carbon black, Co, and cobalt oxide. The mixing amount of the conductive material may be, for example, 0.1 to 10 parts by mass with respect to 100 parts by mass of the positive electrode active material. The binder binds the current collector and the positive electrode active material. The binder may contain any component. The binder may contain, for example, ethylene vinyl acetate (EVA). The mixing amount of the binder may be, for example, 0.1 to 10 parts by mass with respect to 100 parts by mass of the positive electrode active material.

Separator

The separator 13 is in the form of a sheet. The separator 13 is disposed between the positive electrode 11 and the negative electrode 12. The separator 13 physically separates the positive electrode 11 and the negative electrode 12 from each other. The separator 13 may have a thickness of 50 to 500 μm, for example. The separator 13 is porous. The separator 13 may include, for example, a stretched porous membrane or a non-woven fabric. The separator 13 is an electrical insulator. The separator may be made of polyolefin or polyamide, for example.

Electrolytic Solution

The electrolytic solution may include, for example, an alkaline aqueous solution. The alkaline aqueous solution contains an alkali metal hydroxide and water. The alkali metal hydroxide is dissolved in water. The alkali metal hydroxide may have a concentration of 1 to 20 mol/L, for example. The alkali metal hydroxide may include at least one compound selected from the group consisting of potassium hydroxide (KOH), sodium hydroxide (NaOH), and lithium hydroxide (LiOH).

Hereinafter, examples of the present disclosure will be described. However, claims are not limited to the following description.

Applying Voltage to Ni Plate

Figure 1:
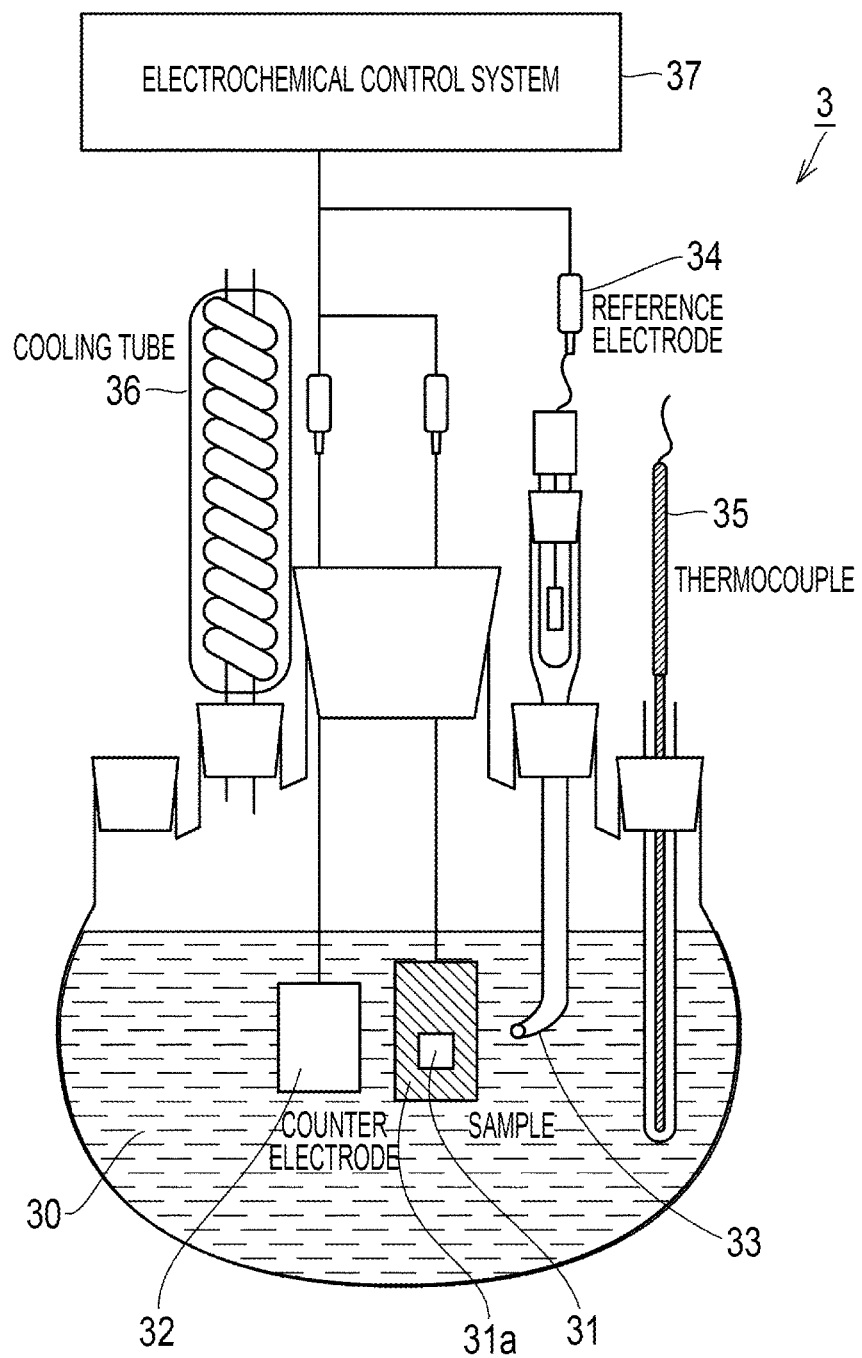
FIG. 1 is a schematic view showing a potential application device used in examples.

FIG. 1 is a schematic view that shows a potential application device used in examples. By using the device shown in FIG. 1, a first voltage and a second voltage corresponding to each of the examples and comparative examples shown in Table 1 were repeatedly alternately applied to a sample (Ni plate) in an alkaline solution. Details will be described below.

As shown in FIG. 1, a potential application device 3 includes a counter electrode 32, a liquid junction tube 33, a reference electrode 34, a thermocouple 35, a cooling tube 36, an electrochemical control system 37, and the like.

A saturated calomel electrode (SCE) was used as the reference electrode 34 necessary for potential control. As an electrolytic solution for SCE, an aqueous solution of $Hg/Hg_2Cl_2$/saturated KCl was used. The potential measured using SCE as a reference electrode (reference electrode) (SCE reference potential) was converted into a potential (SHE reference potential) obtained using a standard hydrogen electrode (SHE) as a reference electrode. Because the reference electrode 34 is installed in the atmosphere, the conversion is based on the relational expression "SHE reference potential=SCE reference potential+0.2415 V" between the SCE reference potential and the SHE reference potential at 25° C. To be more precise, it is desirable that the compounds formed by electrolysis at various single potentials by using the reference electrode as a standard be checked against the potential-pH diagram described above, and the potential difference be appropriately corrected.

The counter electrode 32 is in the form of a plate made of platinum, and has a size of 20 mm×20 mm. A sample 31 is a Ni plate which is masked with an anticorrosive electrical insulating resin 31a except for a surface to be treated. The surface to be treated has a size of 5 mm×5 mm. The distance between the sample 31 and the counter electrode 32 is about 15 mm. The distance between the sample 31 and the liquid junction tube 33 is about 10 to 20 mm. The liquid junction tube 33 is a tube tipped with a conductive substance such that the KCl aqueous solution of the reference electrode 34 and a solution 30 are not mixed but the potential of the sample 31 can be controlled by the reference electrode 34.

In a state where the sample 31 (Ni material) was immersed in the alkaline solution 30, by the electrochemical control system 37, a first potential (5 seconds) and a second potential (10 seconds) shown in Table 1 were repeatedly alternately applied to the sample 31. The alkaline solution 30 was an 8M KOH solution at 80° C. Specifically, in the case of Example 1, a potential of 0.73 V (SHE reference potential) and a potential of 0.27 V (SHE reference potential) were repeatedly applied to the sample 31 for 5 seconds and 10 seconds respectively. In this way, potential application was performed for 72 hours in total. As the electrochemical control system 37, an electrochemical control system (HZ-7000) manufactured by HOKUTO DENKO CORPORATION was used.

The comparative examples for which the first potential or the second potential is described as "N/A" in Table 1 show that only one of the first potential and second potential was continuously applied for 72 hours while the other is not.

TABLE 1

| | | First potential (upper potential) [V] | | | | | | |
|---|---|---|---|---|---|---|---|---|
| | N/A | 0.43 | 0.48 | 0.53 | 0.58 | 0.63 | 0.68 | 0.73 |
| Second potential (lower potential) [V] | N/A | | Comparative Example 1 | | | | | Comparative Example 2 |
| | 0.38 | | Comparative Example 5 | | | | | Comparative Example 6 |
| | 0.27 | | Comparative Example 7 | | | | | Example 1 |
| | 0.23 | Comparative Example 3 | | | | | | Example 2 |
| | 0.18 | Comparative Example 4 | Comparative Example 8 | Example 3 | Example 4 | Example 5 | Example 6 | Example 7 |
| | 0.08 | | Comparative Example 9 | | | | | |

Evaluation

Surface Composition Analysis

For the examples and comparative examples, the composition of the exposed surface of the sample 31 (Ni material) was analyzed by the X-ray diffraction (XRD) method. Specifically, the composition of the surface was analyzed using an XRD analyzer (horizontal X-ray diffractometer SmartLab manufactured by Rigaku Corporation) under the conditions shown in Table 2.

TABLE 2

| Analysis condition | Target | Cu |
|---|---|---|
| | Monochromating | Using multilayer film mirror on incidence side |
| | Target output | 45 kV-200 mA |
| | Detector | 2-Dimensional detector (HyPix3000) |
| | (Normal measurement) | θ-2θ scan |
| | Slit | φ 0.5 mm collimator |
| | Scan speed | 5°/min |
| | Sampling width | 0.01° |
| | Measurement angle (2θ) | 5° to 90° |

Table 3 shows the composition analysis results (chemical species configuring the surface).

TABLE 3

| Composition of Ni surface | | First potential (upper potential) [V] | | | | | | |
|---|---|---|---|---|---|---|---|---|
| | | N/A | 0.43 | 0.48 | 0.53 | 0.58 | 0.63 | 0.68 | 0.73 |
| Second potential (lower potential) [V] | N/A | | | No formation | | | | | No formation |
| | 0.38 | | | No formation | | | | | No formation |
| | 0.27 | | | No formation | | | | | $Ni_2O_3H$, $Ni(OH)_2$ |
| | 0.23 | | $Ni(OH)_2$ | | | | | | $Ni_2O_3H$, $Ni(OH)_2$ |
| | 0.18 | | $Ni(OH)_2$ | $Ni(OH)_2$ | $Ni_2O_3H$ | $Ni_2O_3H$, $Ni(OH)_2$ | $Ni_2O_3H$, $Ni(OH)_2$ | $Ni_2O_3H$, $Ni(OH)_2$ | $Ni_2O_3H$, $Ni(OH)_2$ |
| | 0.08 | | | $Ni(OH)_2$ | | | | | |

As shown in Table 3, it was confirmed that a film that contained $Ni_2O_3H$ as a main component was formed on the surface of the Ni material in Examples 1 to 7 in which the film forming method of the present disclosure was used. In Examples 1 and 7, a film composed of $Ni_2O_3H$ was formed. The comparative examples described as "No formation" show that Ni compounds are not detected by the XRD analysis.

Other Examples

In the same manner as in the above examples, it was confirmed that a film that contained $Ni_2O_3H$ and $Ni(OH)_2$ was formed on the surface of the Ni plate in a case where the temperature of the KOH solution was 70° C., the first potential was 0.73 V, and the second potential was 0.22 V.

In the same manner as in the above examples, it was confirmed that a film composed of $Ni_2O_3H$ was formed on the surface of the Ni plate in a case where the temperature of the KOH solution was 60° C., the first potential was 0.76 V or 0.81 V, and the second potential was 0.26 V.

The embodiments and examples disclosed in the present specification are merely examples in all respects and are not restrictive. The technical scope defined by the description of claims includes all modifications semantically equivalent to the claims. The technical scope defined by the description of claims includes all modifications in the same scope as the scope of the description of the claims.

What is claimed is:

1. A film forming method comprising repeatedly alternately applying a first potential and a second potential to a Ni material in a state where the Ni material is immersed in an alkaline solution, such that a film that contains $Ni_2O_3H$ as a main component is formed on a surface of the Ni material, wherein:
    the first potential is a potential at which Ni turns tetravalent in a Ni—$H_2O$ system;
    the second potential is a potential at which Ni turns divalent in the Ni—$H_2O$ system; and
    the alkaline solution comprises at least one of NaOH and LiOH.

2. The film forming method according to claim 1, wherein the alkaline solution has a temperature of 40° C. to 90° C. and a pH of 10 or higher.

* * * * *